United States Patent [19]
Haderle et al.

[11] Patent Number: 6,006,220
[45] Date of Patent: Dec. 21, 1999

[54] DETERMINING THE OPTIMAL ACCESS PATH FOR A QUERY AT EXECUTION TIME USING AN ACTUAL VALUE FOR EACH VARIABLE IN A QUERY FOR ESTIMATING A FILTER FACTOR

[75] Inventors: Donald J. Haderle, Los Gatos; Jerry Mukai; Randy Mitchell Nakagawa, both of San Jose; Hong Sang Tie, Morgan Hill, all of Calif.

[73] Assignee: International Business Machines Corporation, Armonk, N.Y.

[21] Appl. No.: 08/940,245

[22] Filed: Sep. 30, 1997

[51] Int. Cl.$^6$ .................................................. G06F 17/30
[52] U.S. Cl. ..................... 707/4; 707/2; 707/3; 707/100; 707/104
[58] Field of Search .............................. 707/4, 2, 3, 100, 707/103, 104

[56] References Cited

U.S. PATENT DOCUMENTS

| | | | |
|---|---|---|---|
| 4,956,774 | 9/1990 | Shibamiya et al. ........................ | 707/2 |
| 5,091,852 | 2/1992 | Tsuchida et al. ........................... | 707/2 |
| 5,345,585 | 9/1994 | Iyer et al. ................................... | 707/2 |
| 5,367,675 | 11/1994 | Cheng et al. ............................... | 707/2 |
| 5,615,361 | 3/1997 | Leung et al. ............................... | 707/3 |
| 5,640,555 | 6/1997 | Kleewein et al. . | |
| 5,727,196 | 3/1998 | Strauss, Jr. et al. ........................ | 707/2 |
| 5,742,806 | 4/1998 | Reiner et al. ............................... | 707/3 |
| 5,794,231 | 8/1998 | Li et al. ...................................... | 707/2 |
| 5,806,059 | 9/1998 | Tsuchida et al. ........................... | 707/2 |
| 5,822,747 | 10/1998 | Graefe et al. ............................... | 707/2 |
| 5,822,750 | 10/1998 | Jou et al. .................................... | 707/2 |
| 5,897,649 | 4/1999 | Kennedy .................................... | 707/538 |

OTHER PUBLICATIONS

Internet article, http://btrzxd.fddi.uni-bayreuth.de/cgi-bin/manpages/loader/5, "loader—Run-time linker and loader." (entire document).

Papakonstantinou G. et al., "Dependency-Directed Binding of Variables For Constraint Logic Programming", Lecture Notes in Computer Science, Database and Expert Systems Applications, 5th International Conference DEXA '94, Athens, Greece, Sep. 1994, Proceedings, pp. 734–743.

Internet article, http://www.spi.org/cgi-bin/newqry?. . . c=1&submit=see it&csum=l12575102931, "Technique for Implementing Context Sensitive Text Replacement", Software Patent Institute Database of Software Technologies, Mar. 1990 (entire document).

Internet article, http://www.ssc.com/lj/issue13/kkelf.html, "The ELF Object File Format by Disssection", Kernal Korner, May 1995 (entire document).

*Primary Examiner*—Paul R. Lintz
*Assistant Examiner*—Ella Colbert
*Attorney, Agent, or Firm*—Pretty, Schroeder & Poplawski, P.C.

[57] ABSTRACT

A method, apparatus, and article of manufacture for a computer implemented query compiler. A query is executed in a computer, the query being performed by the computer to retrieve data from a database stored on a data storage device connected to the computer. The query is received containing at least one variable. At execution time, a value is determined for each variable in the query. A filter factor is estimated using the determined value for each variable. Then, an access path is determined for the query using the estimated filter factor.

21 Claims, 4 Drawing Sheets

DETERMINING THE OPTIMAL ACCESS PATH FOR A QUERY AT EXECUTION TIME USING AN ACTUAL VALUE FOR EACH VARIABLE IN A QUERY FOR ESTIMATING A FILTER FACTOR

BACKGROUND OF THE INVENTION

1. Field of the Invention

This invention relates in general to computer-implemented database systems, and, in particular, to improving an access path selection for Structured Query Language with variables in a relational database management system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of performing the query.

The RDBMS software determines an access path for an SQL statement during a bind process. SQL compilation is called a BIND process, and the output of the BIND process is a plan, which is a compiled run-time structure used for executing the SQL statement. The plan includes access paths, which are the paths the RDBMS uses to get to the data that SQL statements request. During the BIND process, an optimizer of the RDBMS software selects an access path for a SQL statement. The access path is the key to determining how well an SQL statement performs.

Currently, when an SQL statement contains a variable or such as a host variable, a parameter marker, the RDBMS uses a default filter factor to determine an access path for the SQL statement. A filter factor, also known as selectivity, is a reference to the number of qualified rows of a table that will be satisfied for the query. For example, if the filter factor is 10%, then 10% of the rows of a table qualify and the remaining rows are filtered out (i.e., are not relevant to processing the query). However, when a SQL statement includes a variable, the default filter factor selected for the SQL statement is typically not optimal, and, therefore, the access path that is determined is not necessarily optimal. There is a need in the art for an improved technique for determining an access path for a SQL statement that contains a variable.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented query compiler.

In accordance with the present invention, a query is executed in a computer, the query being performed by the computer to retrieve data from a database stored on a data storage device connected to the computer. The query is received containing at least one variable. At execution time, a value is determined for each variable in the query. A filter factor is estimated using the determined value for each variable. Then, an access path is determined for the query using the estimated filter factor.

An object of the invention is to provide an improved technique for selecting an access path for an SQL statement. Another object of the invention is to provide a query compiler for SQL statements containing variables.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
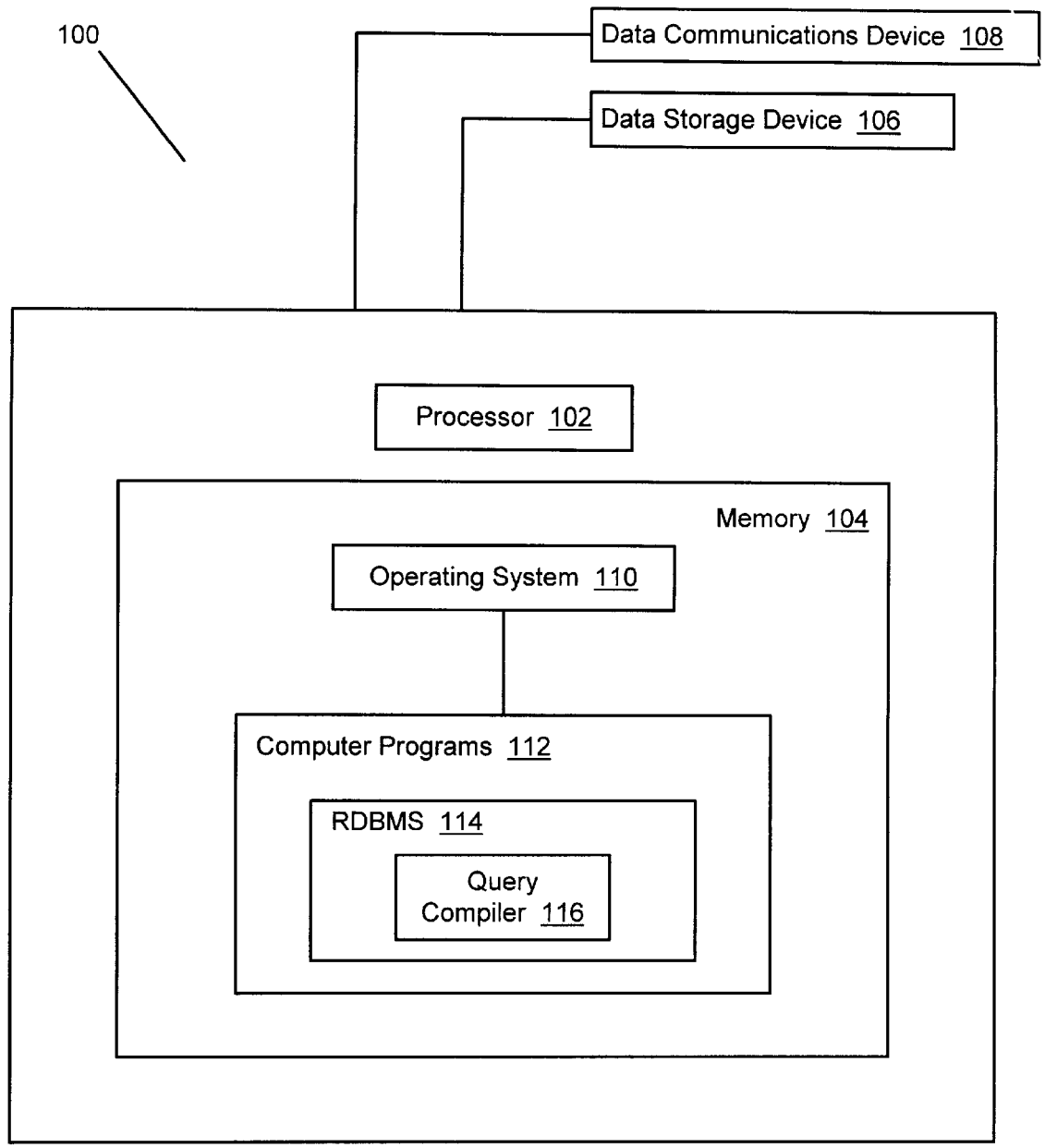
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), and data communications devices 108 (e.g., modems, network interfaces, etc.). It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 110, such as MVS®, AIX®, OS/2®, WINDOWS NT®, WINDOWS®, UNIX®, etc. The operating system 110 is booted into the memory 104 of the computer 100 for execution when the computer 100 is powered-on or reset. In turn, the operating system 110 then controls the execution of one or more computer programs 112 by the computer 100. The present invention is generally implemented in these computer programs 112, which execute under the control of the operating system 110 and cause the computer 100 to perform the desired functions as described herein. Alternatively, the present invention may be implemented in the operating system 110 itself. In particular, the present invention is typically implemented using relational database management system (RDBMS) software 114, such as the DB2® product sold by IBM Corporation, although it may be implemented with any database management system (DBMS) software.

The RDBMS software 114 receives commands from users for performing various search and retrieval functions, termed queries, against one or more databases stored in the data storage devices 106. In the preferred embodiment, these queries conform to the Structured Query Language (SQL) standard, although other types of queries could also be used without departing from the scope of the invention. The queries invoke functions performed by the RDBMS software 114, such as definition, access control, interpretation, compilation, database retrieval, and update of user and system data. The RDBMS software 114 invokes the query compiler 116 to select an optimized access path.

The operating system 110 and computer programs 112 are comprised of instructions which, when read and executed by the computer 100, causes the computer 100 to perform the steps necessary to implement and/or use the present invention. Generally, the operating system 110 and/or computer programs 112 are tangibly embodied in and/or readable from a device, carrier, or media, such as memory 104, data storage devices 106, and/or a remote device couped to the computer 100 via the data communications devices 108. Under control of the operating system 110, the computer programs 112 may be loaded from the memory 104, data storage devices 106, and/or remote devices into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The Query Compiler

The present invention provides a query compiler 116 that re-optimizes an access path for a query (e.g., a SQL statement) containing a variable at execution time. A variable has an unknown value at compile time (i.e., BIND time). For example, host variables, parameter markers, and special registers are variables. For static SQL statements, the query compiler 116 redetermines the access path (i.e., performs the BIND process again) when the SQL statement is executed. For dynamic SQL, the query compiler 116 defers performing the steps to determine an access path (i.e., the PREPARE command process) until an EXECUTE, OPEN, or FETCH command is executed for the SQL statement.

The RDBMS software 114 selects a default filter factor for each predicate in a SQL statement containing a variable, such as a host variable or a parameter marker. The default filter factor is used by an optimizer to optimize the query and select an access path for the SQL statement.

For example, when a dynamic SQL statement contains parameter markers denoted by "?", the RDBMS software 114 selects a default filter factor for the SQL statement for use in determining an access path. The following sample query contains a parameter marker:

SELECT*FROM table1 WHERE c1=?;

When a static SQL statement with host variables is bound during the BIND process, the RDBMS software 114 selects a default filter factor for the SQL statement for use in determining an access path. The following sample query contains a host variable hvcol:

SELECT*FROM table1 WHERE c1=:hvcol;

For an equal predicate, such as COL1=:hv, the RDBMS software 114 will use a default filter factor of 1/Column__Card. However, the actual filter factor may be different when the query is executed and the host variable is replaced by its actual value. For the equal predicate, the actual filter factor may be different from the default filter factor when the data of a column is unevenly distributed. Sometimes the default filter factor is smaller than the actual filter factor, and sometimes the default filter factor is larger than the actual filter factor. For a range predicate, such as COL1>:HV, the difference between the default filter factor and the actual filter factor may be different by orders of magnitude.

The access path chosen by the optimizer in the RDBMS software 114 may not be the optimal access path if the default filter factor is not close to the actual filter factor that is determined when the SQL statement is executed. Therefore, poor query performance can be seen when the queries are executed.

The query optimizer in the RDBMS software 114 may choose an access path that performs well for a query with various host variables. However, it is possible for the RDBMS software 114 to change the access path in a new release or after applying a fix. In this case, the new access path may not perform as well as the old access path. For most of the cases, the inefficient access path selected is due to default filter factors which lead the RDBMS software 114 to optimize the SQL statement in a query scenario that did not accurately reflect the actual query scenario.

The query compiler 116 re-optimizes the access path for a SQL statement that contains variables, such as host variables, parameter markers, and special registers, whose values are not known at compile time (i.e., during the BIND process) for both static SQL and dynamic SQL statements. The query compiler 116 performs the re-optimizing during query execution when the values for the query optimizer are available. The query compiler 116 provides the optimizer of the RDBMS software 114 with these values during the query execution time to be used by the optimizer to select an access path. Because the actual values for the variables of the query are provided, the estimation of the filter factor by the RDBMS software 114 is more accurate than a typical default filter factor. Therefore, the query compiler 116 results in selecting a more optimal query execution plan, and, therefore, query performance for the SQL with variables is greatly improved.

Figure 2:
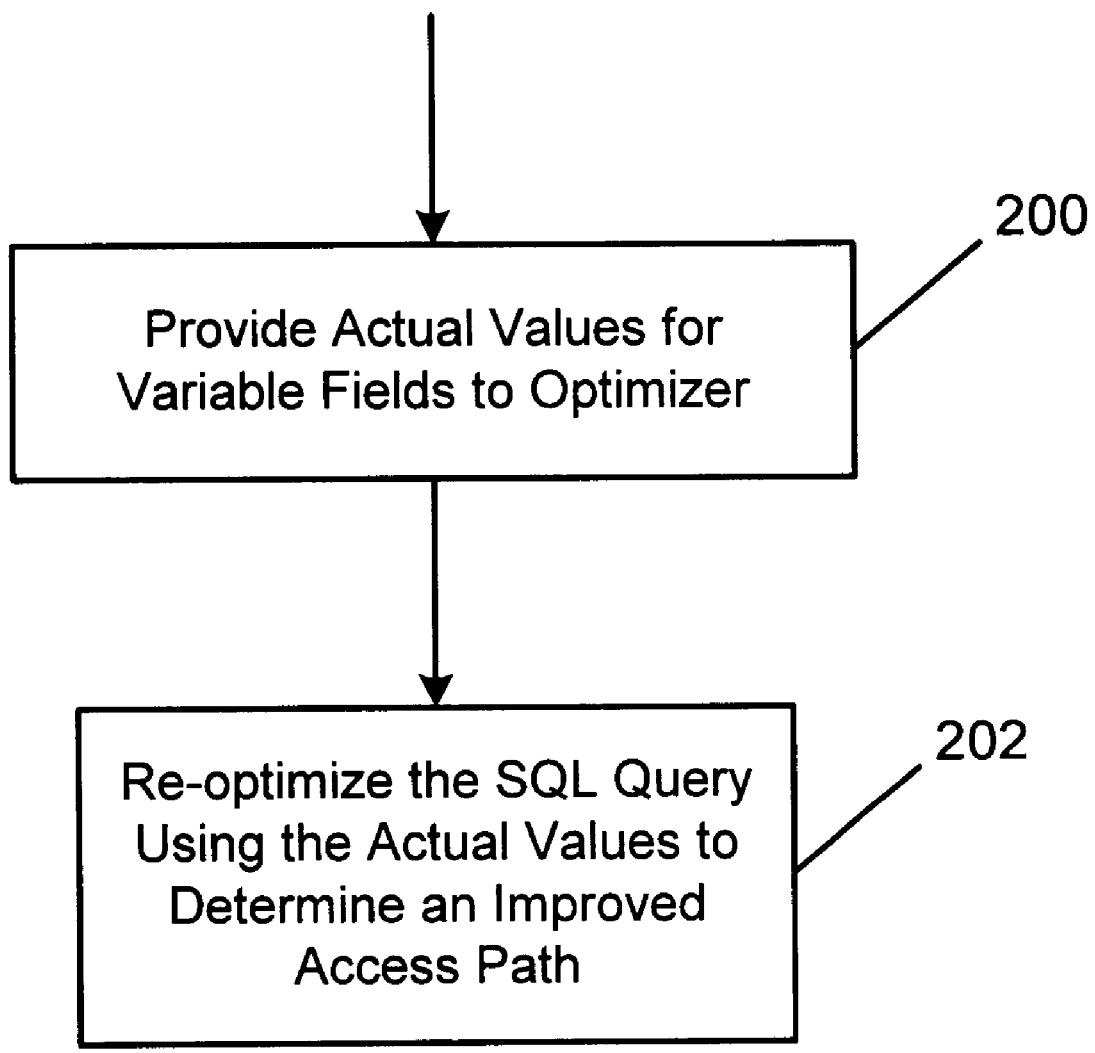
FIG. 2 is a flow diagram that illustrates the steps performed by the query compiler to determine an improved access path.

FIG. 2 is a flow diagram that illustrates the steps performed by the query compiler 116 to determine an improved access path. In Block 200, the query compiler 116 provides actual values for variables to the optimizer of the RDBMS software 114. In Block 202, the query compiler 116 invokes the optimizer to re-optimize the SQL query using the actual values to determine an improved access path.

SQL Options

There are new options for the BIND and REBIND processes for a PLAN and a PACKAGE. A plan is a set of information and access paths used to execute SQL statements. A package is a grouping of one or more plans. The BIND process will compile a SQL statement and generate a PLAN, and the REBIND process will use the plan output by the BIND process and generate an optimized plan. A NOREOPT(VARS) option specifies that access paths are determined only during the BIND process. This is the default option, and with this option, processing is identical to that in conventional systems. The REOPT(VARS) option specifies that access paths are redetermined at execution time, using values of variables that are in effect at the time of execution.

The PREPARE command will be deferred when the REOPT(VARS) option is in effect. A PREPARE command will validate a SQL statement, select an access path for execution, and build an executable form of the SQL statement. Once the PREPARE command is complete, the SQL statement can be executed. Specifying the REOPT(VARS) option implies the DEFER(PREPARE) option, which defers preparation of the SQL statement to execution. The REOPT (VARS) option and the NODEFER(PREPARE) option are mutually exclusive. Specifying the REOPT(VARS) option and the NODEFER(PREPARE) option will result in a BIND process error message.

Static SQL

When the REOPT(VARS) option is in effect, a static SQL statement is processed by performing the BIND process, which includes authorization checking, dependency marking, normal access path selection, and structure generation. The generated structures are not saved, and non-compiled SQL statement text is created instead of compiled object code for the SQL statement. At run time, if no errors were found during the BIND process, the query compiler 116 re-optimizes the SQL statement by parsing again and using actual values for variables in determining a filter factor. If the parse tree from the BIND process can be saved, then extra parsing on the SQL statement is avoided. At this time, authorization checking and dependency marking are not performed. If the SQL statement was bound with a VALIDATE(RUN) option, and the BIND process failed because of an allowable error, the query compiler 116 uses the values of the variables provided by the application during an incremental BIND process. The query compiler 116 will not perform the BIND process twice (once incrementally and again to re-optimize).

The query compiler 116 performs re-optimization for cursor SQL statements during the OPEN command processing. The query compiler 116 performs re-optimization for non-cursor SQL statements during the OPEN command processing of the incremental BIND process.

If the DEFER(PREPARE) option is in effect, a DESCRIBE command will cause the SQL statement to be prepared if it is not already prepared. Static SQL statements which do not bind successfully and have the REOPT(VARS) option in effect will be prepared twice if the DESCRIBE command is issued before SQL statement execution. The DESCRIBE command causes the SQL statement to be prepared without input variable values. The SQL statement must then be prepared again when it is executed using values for variables. To avoid preparing a statement twice, the DESCRIBE command should be issued after the SQL statement is prepared. The SQL statement is prepared on the OPEN command for cursor SQL statements, and on the EXECUTE command for non-cursor SQL statements.

Figure 3:
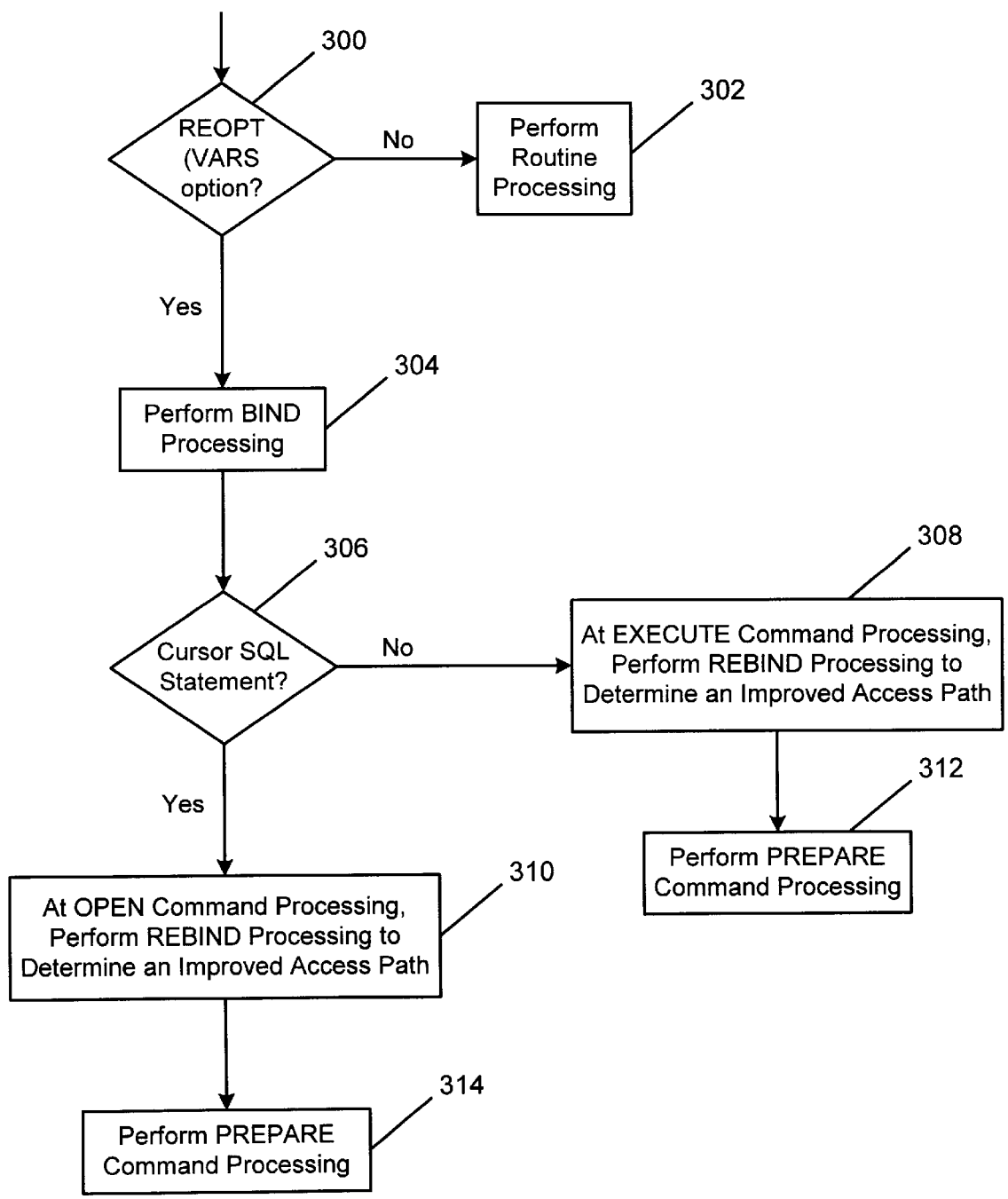
FIG. 3 is a flow diagram that illustrates the steps performed by the query compiler to determine an improved access path for a static SQL statement.

FIG. 3 is a flow diagram that illustrates the steps performed by the query compiler 116 to determine an improved access path for a static SQL statement. In Block 300, the query compiler 116 determines whether the REOPT(VARS) option has been selected. When the REOPT(VARS) option has not been selected, the query compiler 116 continues to Block 302 to perform routine processing. When the REOPT (VARS) option has been selected, the query compiler 116 continues to Block 304 to perform BIND processing.

In Block 306, the query compiler 116 determines whether the SQL statement is a cursor SQL statement. When the SQL statement is not a cursor SQL statement, the query compiler 116 continues to Block 308. In Block 308, at EXECUTE command processing, the query compiler 116 performs REBIND processing to determine an improved access path. In Block 312, the query compiler 116 performs PREPARE command processing. When the SQL statement is a cursor SQL statement, the query compiler 116 continues to Block 310. In Block 310, at OPEN command processing, the query compiler 116 performs REBIND processing to determine an improved access path. In Block 314, the query compiler 116 performs PREPARE command processing.

Dynamic SQL

When the REOPT(VARS) option is in effect, dynamic SQL is processed with the PREPARE command processing deferred until a OPEN, EXECUTE, or FETCH command. If a DESCRIBE command is issued, the SQL statement must be prepared. If the DESCRIBE command is issued prior to an OPEN, EXECUTE, or FETCH command, the SQL statement will be prepared without values for variables. The SQL statement will then be prepared again on the OPEN, EXECUTE, or FETCH command processing with input variable values. Therefore, the DESCRIBE command should be executed after the SQL statement is prepared.

During OPEN, EXECUTE, or FETCH command processing, the SQL statement is parsed and the access path is optimized using values of variables provided by the application. Hence, any SQL processing return codes that can be issued during PREPARE command processing are issued instead on the OPEN, EXECUTE, or FETCH command. The SQL statement and the locks it acquires are released at commit. By using these locks, the query compiler 116 invokes the parser and determines an access path only once. Therefore, the overhead for determining the access path in this case is minimal.

Figure 4:
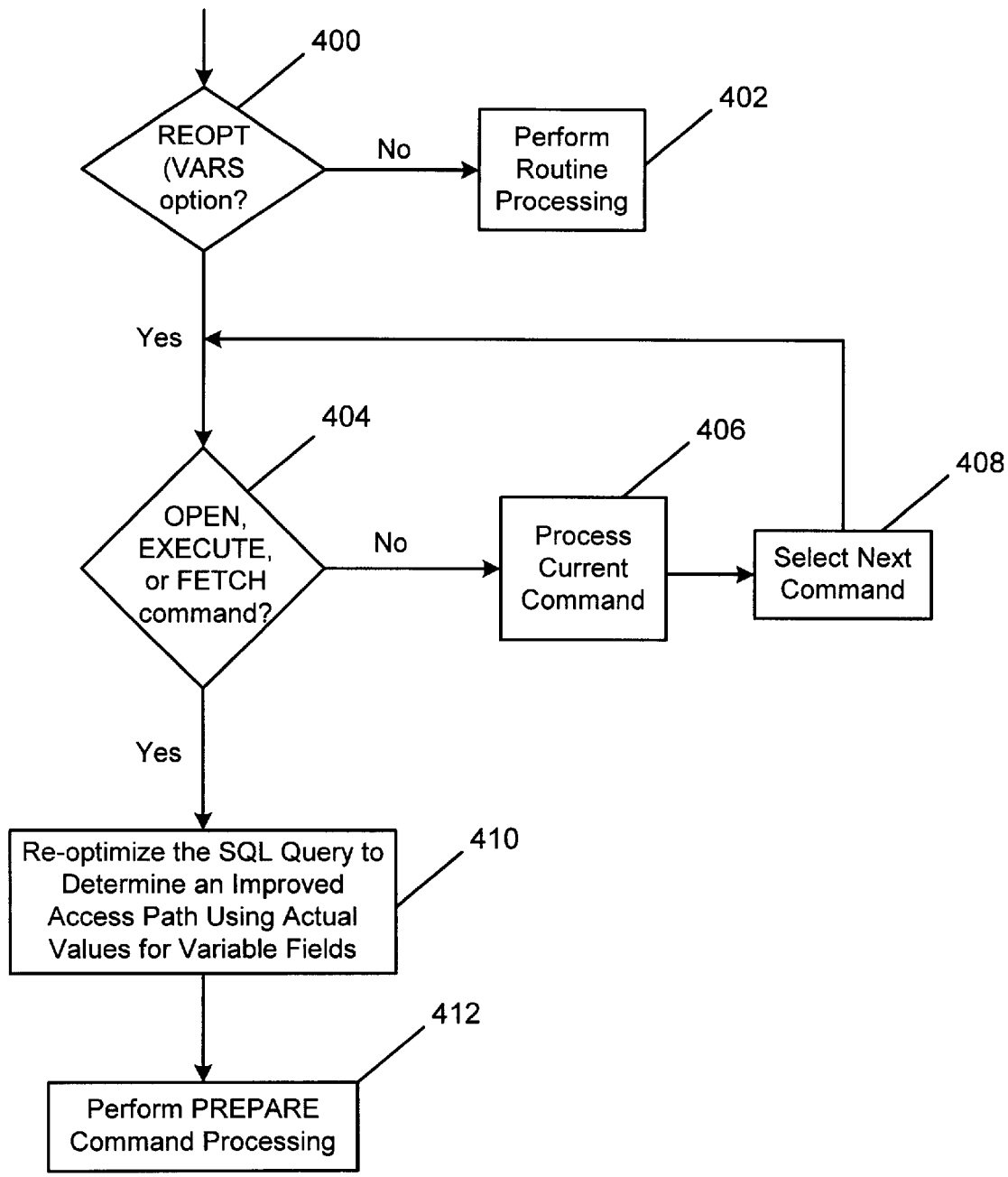
FIG. 4 is a flow diagram that illustrates the steps performed by the query compiler to determine an improved access path for a dynamic SQL statement.

FIG. 4 is a flow diagram that illustrates the steps performed by the query compiler 116 to determine an improved access path for a dynamic SQL statement. In Block 400, the query compiler 116 determines whether the REOPT(VARS) option has been selected. When the REOPT(VARS) option has not been selected, the query compiler 116 continues to Block 402 to perform routine processing. When the REOPT (VARS) option has been selected, the query compiler 116 continues to Block 404 to determine whether the current command is an OPEN, EXECUTE, or FETCH command.

When the current command is not an OPEN, EXECUTE, or FETCH command, the query compiler 116 continues to Block 406 to process the current command. In Block 408, the query compiler 116 selects the next command and loops back to Block 404. When the current command is an OPEN, EXECUTE, or FETCH command, the query compiler 116 continues to Block 410 to re-optimize the SQL query to determine an improved access path using actual values for variables. In Block 412, the query compiler 116 performs PREPARE command processing.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented query compiler. The invention provides an improved technique for selecting an access path for an SQL statement. The invention also provides a query compiler for SQL statements containing variables.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query in a computer, the query being performed by the computer to retrieve data from a database stored on a data storage device connected to the computer, the method comprising the step of:

determining an optimal access path for the query at execution time using an actual value for each variable in the query to estimate a filter factor, wherein each variable is a special register.

2. A method of executing a query in a computer, the query being performed by the computer to retrieve data from a database stored on a data storage device connected to the computer, the method comprising the step of:

determining an optimal access path for the query at execution time using an actual value for each variable in the query to estimate a filter factor, wherein the query is a static SQL statement and the step of determining an optimal access path further comprises the step of rebinding the static SQL statement.

3. The method of claim 2 above, wherein the SQL statement is a cursor SQL statement and the step of rebinding further comprises the step of rebinding on processing of an open command.

4. The method of claim 2 above, wherein the SQL statement is a non-cursor SQL statement and the step of rebinding further comprises the step of rebinding on processing of an execute command.

5. A method of executing a query in a computer, the query being performed by the computer to retrieve data from a database stored on a data storage device connected to the computer, the method comprising the step of:

determining an optimal access path for the query at execution time using an actual value for each variable in the query to estimate a filter factor, wherein the query is a dynamic SQL statement, and further comprising deferring the step of preparation of the dynamic SQL statement until an execute command is processed.

6. A method of executing a query in a computer, the query being performed by the computer to retrieve data from a database stored on a data storage device connected to the computer, the method comprising the step of:

determining an optimal access path for the query at execution time using an actual value for each variable in the query to estimate a filter factor, wherein the query is a dynamic SQL statement, and further comprising the step of deferring preparation of the dynamic SQL statement until a fetch command is processed.

7. A method of executing a query in a computer, the query being performed by the computer to retrieve data from a database stored on a data storage device connected to the computer, the method comprising the step of:

determining an optimal access path for the query at execution time using an actual value for each variable in the query to estimate a filter factor, wherein the query is a dynamic SQL statement, further comprising the step of deferring preparation of the dynamic SQL statement until an open command is processed.

8. An apparatus for executing a query, comprising:

a computer having a data storage device connected thereto, wherein the data storage device stores a database;

one or more computer programs, performed by the computer, for determining an optimal access path for the query at execution time using an actual value for each variable in the query to estimate a filter factor, wherein each variable is a special register.

9. An apparatus for executing a query, comprising:

a computer having a data storage device connected thereto, wherein the data storage device stores a database;

one or more computer programs, performed by the computer, for determining an optimal access path for the query at execution time using an actual value for each variable in the query to estimate a filter factor, wherein the query is a static SQL statement and the means for determining an optimal access path further comprises the means for rebinding the static SQL statement.

10. The apparatus of claim 9 above, wherein the SQL statement is a cursor SQL statement and the means for rebinding further comprises the means for rebinding on processing of an open command.

11. The apparatus of claim 9 above, wherein the SQL statement is a non-cursor SQL statement and the means for rebinding further comprises the means for rebinding on processing of an execute command.

12. An apparatus for executing a query, comprising:

a computer having a data storage device connected thereto, wherein the data storage device stores a database;

one or more computer programs, performed by the computer, for determining an optimal access path for the query at execution time using an actual value for each variable in the query to estimate a filter factor, wherein the query is a dynamic SQL statement, and further comprising the means for deferring preparation of the dynamic SQL statement until an execute command is processed.

13. An apparatus for executing a query, comprising:

a computer having a data storage device connected thereto, wherein the data storage device stores a database;

one or more computer programs, performed by the computer, for determining an optimal access path for the query at execution time using an actual value for each variable in the query to estimate a filter factor, wherein the query is a dynamic SQL statement, and further comprising the means for deferring preparation of the dynamic SQL statement until a fetch command is processed.

14. An apparatus for executing a query, comprising:

a computer having a data storage device connected thereto, wherein the data storage device stores a database;

one or more computer programs, performed by the computer, for determining an optimal access path for the query at execution time using an actual value for each variable in the query to estimate a filter factor, wherein the query is a dynamic SQL statement, and further comprising the means for deferring preparation of the dynamic SQL statement until an open command is processed.

15. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the step of:

determining an optimal access path for the query at execution time using an actual value for each variable in the query to estimate a filter factor, wherein each variable is a special register.

16. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the step of:

determining an optimal access path for the query at execution time using an actual value for each variable in the query to estimate a filter factor, wherein the query is a static SQL statement and the step of determining an optimal access path further comprises the step of rebinding the static SQL statement.

17. The method of claim 16 above, wherein the SQL statement is a cursor SQL statement and the step of rebinding further comprises the step of rebinding on processing of an open command.

18. The method of claim 16 above, wherein the SQL statement is a non-cursor SQL statement and the step of rebinding further comprises the step of rebinding on processing of an execute command.

19. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the step of:

determining an optimal access path for the query at execution time using an actual value for each variable in the query to estimate a filter factor, wherein the query is a dynamic SQL statement, and further comprising deferring the step of preparation of the dynamic SQL statement until an execute command is processed.

20. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the step of:

determining an optimal access path for the query at execution time using an actual value for each variable in the query to estimate a filter factor, wherein the query is a dynamic SQL statement, and further comprising the step of deferring preparation of the dynamic SQL statement until a fetch command is processed.

21. An article of manufacture comprising a computer program carrier readable by a computer and embodying one or more instructions executable by the computer to perform method steps for executing a query, the query being performed by the computer to retrieve data from a database stored in a data storage device connected to the computer, the method comprising the step of:

determining an optimal access path for the query at execution time using an actual value for each variable in the query to estimate a filter factor, wherein the query is a dynamic SQL statement, and further comprising the step of deferring preparation of the dynamic SQL statement until an open command is processed.

* * * * *